United States Patent

[11] 3,540,525

[72] Inventors Arthur M. Bradshaw
Madison, Wisconsin;
Richard C. Hennessey, Chicago, Illinois
[21] Appl. No. 786,076
[22] Filed Dec. 23, 1968
[45] Patented Nov. 17, 1970
[73] Assignee Honeywell Inc.
Minneapolis, Minnesota
a corporation of Delaware

[54] PNEUMATIC CONTROL APPARATUS
13 Claims, 2 Drawing Figs.
[52] U.S. Cl. ................................................... 165/16,
165/26, 165/122
[51] Int. Cl. ..................................................... F25b 29/00
[50] Field of Search ........................................... 165/16, 26,
27, 122

[56] References Cited
UNITED STATES PATENTS
3,193,000 7/1965 Bressoud ...................... 165/26

Primary Examiner—Charles Sukalo
Attorneys—Lamont B. Koontz, Francis A. Sirr, Omund R. Dahle and John S. Sumners ABSTRACT: A pneumatic system for controlling a unit ventilator that employs a heating coil, a refrigeration coil and a ventilating damper. The control system takes the form of a closed loop that includes a unique arrangement of restrictions and check valves. The loop receives a temperature sensitive variable input pressure and a two-level air pressure supply, and provides output pressures for controlling a heating medium passing through the heating coil, starting and stopping the refrigeration unit, and positioning the ventilating damper. The control loop further includes bypassable restrictions disposed to enable performance of a selected one of the basic ASHRAE unit ventilator control cycles.

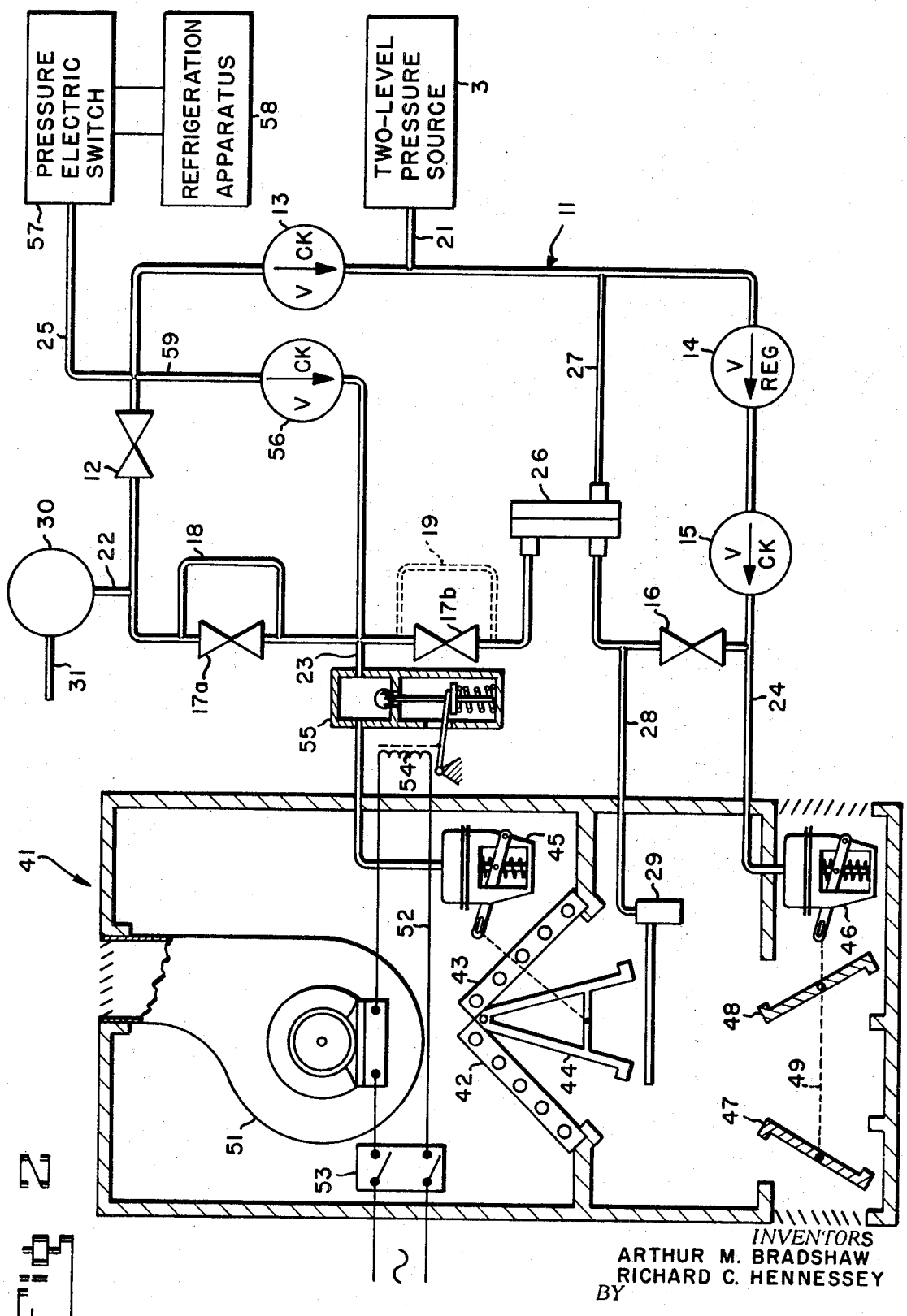

PNEUMATIC CONTROL APPARATUS

BACKGROUND OF THE INVENTION

The design of unit ventilators has experienced a trend to the use of direct expansion refrigeration coils with an integral or remote condensing unit for cooling purposes, in place of conventional circulating water coils. Because these units operate in a slightly different manner, it has become desirable to provide a new control system that can properly handle the various summer–winter and day–night control cycles.

As these direct expansion coil unit ventilators have become more popular, it has become important from the standpoint of minimum cost and proper sequence of control to factory install the control systems. Accordingly there has arisen the need for a standard control package that can perform any of the three basic cycles of unit ventilator control, as set out on page 850 of the "ASHRAE Guide and Data Book, Fundamentals and Equipment, for 1965 and 1966", published by the American Society of Heating, Refrigeration and Air Conditioning Engineers, Inc.

SUMMARY OF THE INVENTION

The inventive pneumatic control system is suited particularly to the control of unit ventilators that employ direct expansion refrigeration coils. The circuit takes the form of a closed-loop and utilizes restrictions and check valves in a unique manner such that a single acting thermostat can provide control of the heating and cooling media and the ventilating means during both day and night, summer and winter. The use of two bypassable restrictions is also contemplated within the control loop, one of which is selected to effect performance of one of the basic ASHRAE unit ventilator control cycles.

BRIEF DESCRIPTION OF THE DRAWING

FIG. 2 discloses the inventive concept embodied in a specific unit ventilator application.

DESCRIPTION OF THE PREFERRED EMBODIMENT

Figure 1:
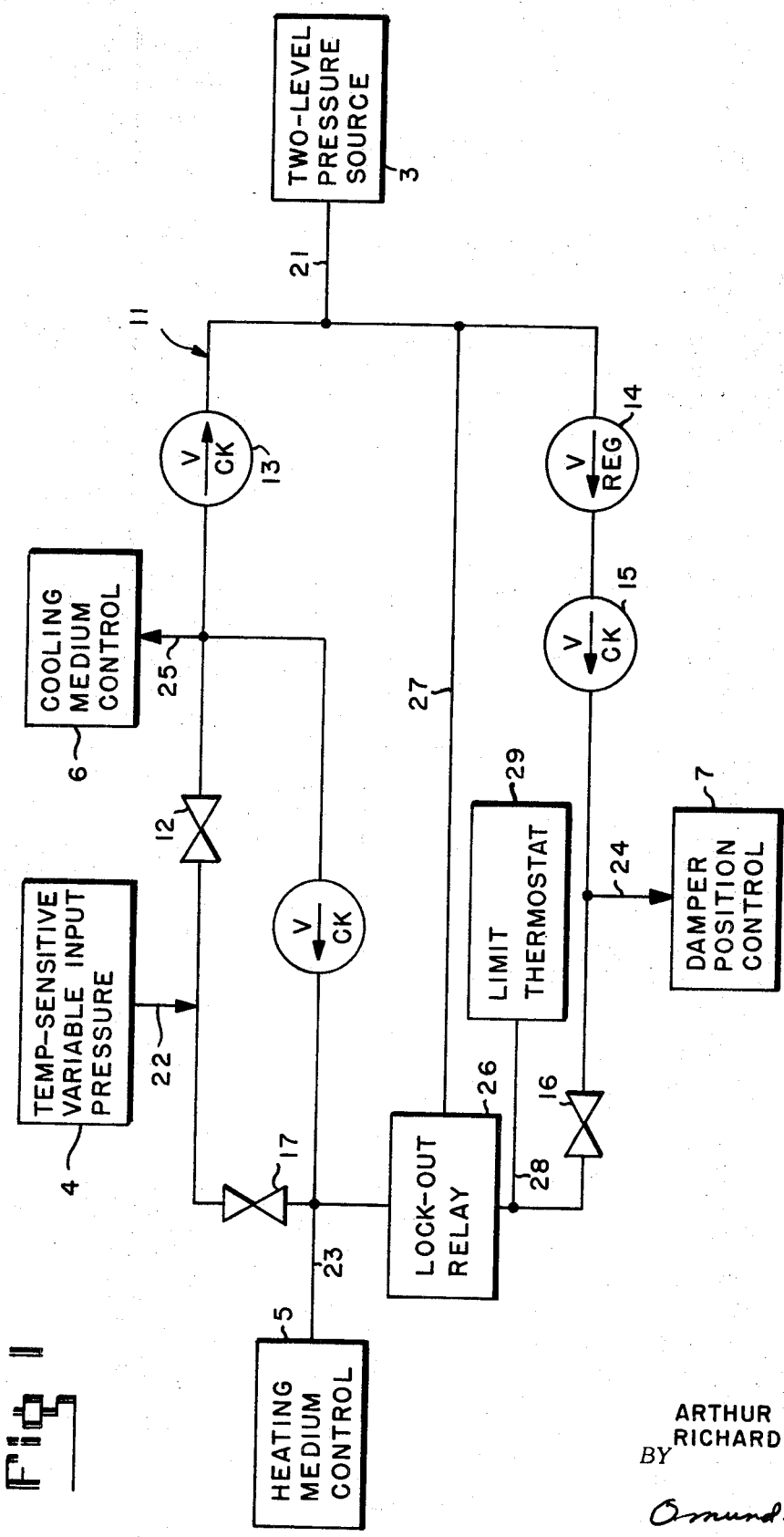
FIG. 1 is a general disclosure of the invention in block diagram form.

FIG. 1 discloses the inventive concept in block diagram form, including a pneumatic control loop 11 that interconnects a restriction 12, check valve 13, a pressure regulating valve 14, a check valve 15, a restriction 16, and a restriction 17 as shown. Control loop 11 has an inlet 21 which is connected to a two-level source of air pressure 3, and an inlet 22 which receives a variable input pressure from a temperature sensitive device 4. Outlets 23 and 25 provide output pressures for a heating medium control 5 and a cooling medium control 6, respectively, and outlet 24 provides the output pressure for a ventilating damper position control 7. Disposed between restrictions 16 and 17 is a lockout relay 26 which also communicates with the source of air pressure 3 by means of a conduit 27. Its function is to block the passage of air between restrictions 16, 17 in response to one of the levels of air pressure. A low limit thermostat 29 is connected to the control loop 11 by a conduit 28 between restriction 16 and lockout relay 26. Thermostat 29 is of the bleed type and provides an overriding control function for selected control apparatus.

For purposes of operation, let it be assumed that the two levels of air pressure provided by the pressure source art 18 p.s.i. and 0 p.s.i., the higher for summer and the lower for winter; that the temperature sensitive device 4 is direct acting (variable input pressure at inlet 22 varies as a direct function of temperature); that lockout relay 26 blocks control loop 11 in response to the highest (summer) supply pressure; and that the heating medium control 5, cooling medium control 6 and damper position control 7 are chosen to properly respond to the direct acting variable input pressure.

The variable input pressure has two alternative paths as it enters the control loop 11 through inlet 22. The first path is through restriction 12 to the cooling medium control 6 through outlet 25, and to check valve 13. Assuming winter operation, the air supply pressure is 0 p.s.i. (the equivalent of venting inlet 21 to atmosphere), and consequently the control pressure downstream from restriction 12 is continuously exhausted. In the absence of a control pressure at outlet 25, the cooling medium control 6 is inactive. This exhausted condition exists in control loop 11 as far as pressure regulating valve 14 and check valve 15, which prevent further venting.

The second path for the variable input pressure is through restriction 17 to the heating medium control 5 and on to the lockout relay 26 which, by reason of the lack of pressure in conduit 27, is open. Accordingly, the variable input pressure is allowed to continue through restriction 16 and on to the damper position control 7 through outlet 24 before it is stopped by the check valve 15. As mentioned above, the variable input pressure reaching this portion of control loop 11 is subject to the overriding control of limit thermostat 29 which bleeds the loop to decrease the input pressure when predetermined temperature conditions are not satisfied. From the foregoing, it is evident that for an air supply pressure of 0 p.s.i. in the winter, the variable input pressure is capable of controlling the heating medium control 5 and the damper position control 7, but not the cooling medium control 6.

In the summer, the pressure source 3 provides an 18 p.s.i. supply pressure that back biases check valve 13 and prevents the variable input pressure from bleeding away. Accordingly, the cooling medium control 6 receives a control pressure through outlet 25 and is controlled thereby. The alternative path for the variable input pressure is through restriction 17 to the heating medium control 5 through outlet 23, but further passage is precluded by lockout relay 26, which has assumed its blocking position by virtue of the higher supply pressure as sensed through conduit 27. Accordingly, damper position control 7 is unable to receive the control pressure through restriction 16 and outlet 24. However, damper position control 7 does receive a control pressure from pressure source 3 after reduction to a predetermined value by the pressure regulator 14 and passage through check valve 15.

FIG. 2 discloses the inventive concept in combination with a unit ventilator 41. The essential parts of unit ventilator 41 include a heating coil 42, a cooling coil 43 and a face and bypass damper 44 which determines the path or paths for circulating air to take. The position of face and bypass damper 44 is determined by damper motor 45, which receives a control pressure from outlet 23 of control loop 11. Damper 44 and damper motor 45 are connected to effect movement of damper 44 toward heating coil 42 in response to increasing variable input pressure. The admission of outside ventilating air to unit ventilator 41 is controlled by normally closed damper 47 and normally open damper 48, which communicate with outside air and return air, respectively. Linkage 49 connects dampers 47 and 48 such that when one is fully closed the other is fully open, and conversely. Damper motor 46 controls the position of dampers 47 and 48 in response to a control pressure from outlet 24. A low limit air stream thermostat 29 is also connected to control loop 11 by means of a conduit 28. Preferably, low limit thermostat 29 is a rod and tube thermostat of the bleed type that is set to variably bleed a portion of control loop 11 under predetermined cold conditions and thereby provide an overriding control for dampers 47, 48 and for damper 44, depending on the location of restriction 17 as explained below. Air circulation through unit ventilator 41 is provided by a blower 51 which is connected to a source of electricity through an electric line 52 and a switch 53. Included in this electrical circuit is a solenoid 54 that actuates a venting valve 55 to exhaust pressure in a portion of the control loop 11 when power to blower 51 fails. Inclusion of venting valve 55 at outlet 23 necessitates the use of a check valve 56 connected by a conduit 59 as shown to the control loop 11 at output 23 and output 25. The function of check valve 56 is explained in greater detail below.

The temperature sensitive variable input pressure admitted to control loop 11 through inlet 22 is provided by a direct acting room or space thermostat 30, which receives main line pressure through an inlet 31. Outlet 25 is connected to a normally open pressure-electric switch 57 that turns refrigeration apparatus 58 on to provide a cooling medium to cooling coil 43 through connecting means, not shown. Heating coil 42 also receives its supply of heating medium from a source not shown.

The control loop 11 of FIG. 2 includes two fluid restrictions 17a, 17b inserted on opposite sides of outlet 23. It is intended that only one of the restrictions 17a, 17b be used, and accordingly, bypasses 18, 19 are provided as shown. These bypassable restrictions 17a, 17b are included to enable the performance of the basic ASHRAE unit ventilator cycles, as will be explained in greater detail below.

Let it be initially assumed that the system is set for winter operation (supply pressure at 21 is 0 p.s.i.), bypass 18 is in use and switch 53 is closed so that blower 51 is operating and solenoid 54 closes venting valve 55 to allow the variable input pressure to reach damper motors 45, 46. With supply pressure set at 0 p.s.i., the variable input pressure admitted to control loop 11 through inlet 22 passes through restriction 12 and is then continuously bled through check valve 13, preventing pressure from building up sufficiently to actuate pressure to electric switch 57. Accordingly, the refrigeration apparatus 58 does not operate when the pressure source is set at the winter supply level.

In the opposite direction, the variable input pressure goes through bypass 18 and reaches a three-way juncture. Check vale 56 prevents a pressure drop in one direction, and in the opposite direction the pressure signal reaches damper motor 45 as solenoid 54 holds venting valve 55 closed. In the third direction, the signal pressure passes through fluid restriction 17b (bypass 19 is not in use) and continues to lockout relay 26, which is open by virtue of the 0 p.s.i. supply pressure. The control pressure in this portion of the circuit is further controlled by air stream thermostat 29, which is set to prevent the unit ventilator discharge air temperature from dropping below a predetermined value. The signal pressure then passes through fluid restriction 16 to damper motor 46 to control the position of dampers 47, 48. Check valve 15 prevents the signal pressure from passing further in control loop 11.

Because fluid restriction 17b is disposed between outlet 23 and air stream thermostat 29, it follows that the limiting function provided by the thermostat 29 affects damper motor 46 only. Damper motor 45 operates purely as a function of the variable input pressure, while damper 46 moves in response to air stream thermostat 29 as well as room thermostat 30. This is in accordance with ASHRAE unit ventilator cycle III, which specifies the admission of a variable amount of outdoor air as needed, to maintain a fixed temperature of the air entering the heating element. This is controlled by air stream thermostat 29, which is set low enough to provide cooling when needed.

If the same conditions exist but bypass 19 is used in place of bypass 18, it is evident that the air stream thermostat 29 can regulate the damper motor 45 as well as damper motor 46 since no fluid restriction is disposed therebetween. Hence, damper motors 45, 46 are together under the influence of both air stream thermostat 29 and room thermostat 30 in accordance with ASHRAE unit ventilator cycles I and II. Cycle I provides for the admission of a fixed maximum quantity of outdoor air (usually 100 percent) when room temperature comes within the room thermostat throttling range, while cycle II provides for the admission of a minimum amount of outdoor air during the heating and ventilating stage. This percentage is gradually increased to a maximum, if needed, during the cooling and ventilating stage. In terms of equipment, the difference between cycles I and II lies in the use of a ventilation damper motor 46 with a hesitation characteristic for cycle II operation. The hesitation occurs during the heating and ventilating state, as stated above, and the ventilating damper position is gradually increased during the cooling and ventilating stage.

During the summer months, the supply pressure admitted to control loop 11 through inlet 21 is switched to 18 p.s.i. Under this condition, check valve 13 is back biased sufficiently to prevent the variable input pressure from bleeding down, and the pressure to electric switch 57 governing operation of the refrigeration apparatus 58 is actuated as a function of this control pressure. Switch 57 is preferable set to effect a slight gap between the cooling and heating functions.

With the supply pressure set at its higher value, lockout relay 26 senses the pressure change through conduit 27 and is actuated to its blocking position. The variable input pressure coming from room thermostat 30 is thus unable to reach air stream thermostat 29 or damper motor 46. However, dampers 47, 48 can be held at a predetermined minimum ventilating position by virtue of the supply pressure passing through pressure regulating valve 14 and check valve 15. Air stream thermostat 29 is unable to affect this minimum positioning of dampers 47, 48 because of fluid restriction 16.

If power to the blower 51 fails during either the summer or winter, venting valve 55 is arranged to exhaust the pressure lines with which it communicates (including conduit 59 through check valve 56), thereby allowing dampers 44, 47, 48 and pressure-electric switch 57 to move to their respective normally open or normally closed positions. This fail-safe function is necessary to prevent damage to the coils 42, 43 that might result from freezing. In the winter, a power failure causes the closing of damper 47 to prevent cold outside air from reaching heating coil 42. In the summer, a failure of power to the blower causes the refrigeration apparatus 58 to be turned off, thus preventing the cold refrigerant from reaching cooling coil 43 while the blower is not operating. Freezing can occur under either of these conditions.

The inventive concept can be easily adapted to control other types of air conditioning apparatus that employ different types of heating and cooling equipment. For instance, it may be desirable to use sequentially controlled valves with the heating and cooling coil 42, 43 in place of the damper 44 and damper motor 45. Another possibility is the use of electric heating coils turned on and off by a pneumatic step controller.

It may also be desirable to effect fail-safe venting of the pressure lines in response to the lack of air motion produced by blower 51, rather than in response to the failure of the electrical power supply. If the heating medium is steam, it is normally preferable not to exhaust the control pressure to a normally open steam valve in response to a blower failure. This can be accomplished with a three-way venting valve connected to vent the signal pressure leading to damper motor 46 while continuing to allow the control pressure to reach damper motor 45.

We claim:
1. Control apparatus for air conditioning means that utilizes a heating medium, a cooling medium, means for regulating the admission of ventilating air thereto and means for causing the circulation of air therethrough, comprising:
   fluid conduit means forming a closed loop and connecting, in order,
   a first fluid restriction,
   a first check valve means,
   means providing a pressure regulating and a check valve function,
   a second fluid restriction, and
   a third fluid restriction;
   the first check valve means and the pressure regulating and check valve means arranged to allow fluid flow in a direction coincident with the stated order;
   two-level pressure supply means connected to the conduit means between the first check valve means and the pressure regulating and check valve means;
   means disposed in the conduit means between the second and third fluid restrictions for blocking fluid flow therebetween in response to one level of supply pressure;
   inlet means disposed between the third and first fluid restrictions for admitting a temperature responsive variable input pressure to the conduit means;

first outlet means disposed between the first restriction means and the flow blocking means providing an output pressure for controlling the heating capability of the heating medium;

second outlet means disposed between the first fluid restriction and the first check valve means providing an output pressure for controlling the cooling capability of the cooling medium;

third outlet means disposed between the pressure regulating and check valve means and the second fluid restriction providing an output pressure for the means regulating the admission of ventilating air to the unit ventilator; and bleed type temperature responsive means connected to the conduit means between the second fluid restriction and the flow blocking means and disposed in the unit ventilator to sense the circulation air temperature and thereby provide an overriding control for the means regulating the admission of air to the unit ventilator.

2. The apparatus as defined by claim 1, and further comprising space thermostat means disposed within a space the temperature of which is controlled by the unit ventilator, the space thermostat connected to the inlet means to provide a temperature responsive variable input pressure to the conduit means.

3. The apparatus as defined by claim 1, and further comprising a heat exchanger through which the heating medium passes, the heat exchanger disposed within the unit ventilator to enable heating of circulating air thereby, damper means for controlling the flow of circulating air past the heat exchanger, and motor means for establishing the position of the damper means, the first outlet means connected with the motor means.

4. The apparatus as defined by claim 1, and further comprising a heat exchanger through which the cooling medium passes, the heat exchanger disposed within the unit ventilator to enable cooling of circulating air thereby, damper means for controlling the flow of circulation air past the heat exchanger, and motor means for establishing the position of the damper means, the first outlet means connected with the motor means.

5. The apparatus as defined by claim 4, wherein the cooling medium is provided by refrigeration apparatus controlled by means connected to the second outlet means, the heat exchanger comprising the evaporator coil of the refrigeration apparatus.

6. The apparatus as defined by claim 1, wherein the means regulating the admission of ventilating air comprises damper means controlled by motor means connected to the third outlet means.

7. The apparatus as defined by claim 1, wherein the first outlet means is disposed between the first and third fluid restrictions.

8. The apparatus as defined by claim 1, wherein the first outlet means is disposed between the third fluid restriction and the flow blocking means.

9. The apparatus as defined by claim 8, and further comprising a fourth fluid restriction disposed in the conduit means between the first outlet means and the flow blocking means, the third and fourth fluid restrictions being selectively bypassable.

10. The apparatus as defined by claim 5, and further comprising means for determining the operational status of the air circulating means, the operation determining means constructed and arranged to prevent operation of the refrigeration apparatus and preclude the admission of ventilating air when the air circulating means is not operating.

11. The apparatus as defined by claim 10, wherein:
the air circulating means is an electrically operated blower adapted for connection with an electrical source through a circuit including a switch;
the admission of ventilating air is regulated by normally closed damper means controlled by motor means connected to the third outlet means;
the refrigeration apparatus controlling means effects operation of the refrigeration apparatus with an increase in the variable input pressure;
and the means for determining operation of the air circulating means comprises electrically actuated valve means forming a part of the electrical circuit and communicating with the fluid conduit means at said second point, the valve means arranged to seal the conduit means upon application of electricity and to vent the conduit means in the absence of electricity; and
the apparatus further comprising further check valve means forming a fluid connection between a first point in the conduit means between the first fluid restriction and the first check valve means and a second point in the conduit means between the first fluid restriction and the flow blocking means, said further check valve means disposed to allow fluid flow only from the first point to the second point.

12. The apparatus as defined by claim 1, and further comprising:
a first heat exchanger through which the heating medium passes, the first heat exchanger disposed within the unit ventilator to enable heating of circulating air thereby;
a second heat exchanger through which the cooling medium passes, the second heat exchanger disposed adjacent the first heat exchanger within the unit ventilator to enable cooling of circulating air thereby;
damper means for inversely controlling the flow of circulating air past the first and second heat exchangers; and
and motor means for determining the position of the damper means, the first outlet means connected with the motor means.

13. The apparatus as defined by claim 1, wherein the pressure regulating valve and a check valve means comprises a pressure regulating valve and a check valve connected in series.